(12) United States Patent
Valdes Simancas

(10) Patent No.: US 9,758,411 B2
(45) Date of Patent: Sep. 12, 2017

(54) COMBINED BIOREACTOR FOR THE TREATMENT OF WASTE WATER, BY MEANS OF ANAEROBIC, AEROBIC AND ANOXIC PROCESSES OF DEGRADATION OF ORGANIC MATTER WITH ZONE SEPARATOR SYSTEM AND COLLECTION OF BIOGASES, SCUM AND SLUDGE

(71) Applicant: Francisco Xavier Valdes Simancas, Jalisco (MX)

(72) Inventor: Francisco Xavier Valdes Simancas, Jalisco (MX)

( * ) Notice: Subject to any disclaimer, the term of this patent is extended or adjusted under 35 U.S.C. 154(b) by 217 days.

(21) Appl. No.: 14/379,207

(22) PCT Filed: Dec. 19, 2012

(86) PCT No.: PCT/MX2012/000138
§ 371 (c)(1),
(2) Date: Aug. 15, 2014

(87) PCT Pub. No.: WO2013/129901
PCT Pub. Date: Sep. 6, 2013

(65) Prior Publication Data
US 2015/0008169 A1    Jan. 8, 2015

(30) Foreign Application Priority Data

Mar. 2, 2012   (MX) .................... MX/a/2012/002707

(51) Int. Cl.
*C02F 1/20*   (2006.01)
*B01D 19/00*   (2006.01)
(Continued)

(52) U.S. Cl.
CPC .............. *C02F 3/301* (2013.01); *C02F 3/082* (2013.01); *C02F 3/305* (2013.01); *C02F 3/307* (2013.01);
(Continued)

(58) Field of Classification Search
CPC ...... C02F 3/2846; C02F 3/082; C02F 3/2873; C02F 3/301; C02F 2203/006; C02F 3/302;
(Continued)

(56) References Cited

U.S. PATENT DOCUMENTS 4,144,174 A * 3/1979 Graham ................. B01D 21/34
                                                    210/527
4,692,241 A    9/1987 Nicholson
(Continued)

FOREIGN PATENT DOCUMENTS

BE          1012053       4/2000
CN         201962121      9/2011
(Continued)

OTHER PUBLICATIONS

International Search Report for PCT/MX2012/000138, English translation attached to original, Both completed by the Spanish Patent Office on May 31, 2013, All together 10 Pages.

*Primary Examiner* — Claire Norris
(74) *Attorney, Agent, or Firm* — Feeney Law Group; Alan F. Feeney

(57) ABSTRACT

A bioreactor for anaerobic, aerobic and anoxic digestion of organic matter from wastewater, having a bottom anaerobic zone where the wastewater is fed where anaerobic bacteria produces biogas and the sludge produced is deposited on the bottom and subsequently extracted. An anoxic middle zone contains denitrifying bacteria which converts nitrates to nitrogen, and an aerobic zone at the upper part where at least one biological contact rotor is disposed, which degrade organic matter remaining in the water. The growth of nitrifying bacteria converts ammonia nitrogen into nitrites and nitrates. The tank has a plurality of rhomboids for biogas, sludge and scum collection that join together form a intermediate polyhedral separator panel. The rhomboids joined (Continued)

together define conical collectors with connecting nozzles of ducts from a capture and conduction network of biogas and funnel-shaped manifolds with connecting nozzles of ducts that define a capture and conduction network of sludge and scum.

16 Claims, 10 Drawing Sheets

(51) Int. Cl.
| | | |
|---|---|---|
| *B01D 21/00* | (2006.01) | |
| *C02F 3/30* | (2006.01) | |
| *C02F 3/08* | (2006.01) | |
| *C02F 11/02* | (2006.01) | |

(52) U.S. Cl.
CPC ........ *C02F 11/02* (2013.01); *C02F 2203/002* (2013.01); *C02F 2203/006* (2013.01); *C02F 2303/12* (2013.01); *Y02E 50/343* (2013.01); *Y02W 10/12* (2015.05); *Y02W 10/15* (2015.05)

(58) Field of Classification Search
CPC .. C02F 3/10; C02F 3/12; Y02W 10/12; B01D 21/0039; B01D 21/0045; B01D 21/2494; B01D 19/0015; B01D 21/0042; B01D 21/0069

USPC .......... 210/188, 521, 802; 96/220, 197, 356, 96/392

See application file for complete search history.

(56) References Cited

U.S. PATENT DOCUMENTS

| | | | |
|---|---|---|---|
| 5,338,445 A | 8/1994 | Zumbragel et al. | |
| 5,395,529 A | 3/1995 | Butler | |
| 5,500,118 A | 3/1996 | Coenen et al. | |
| 6,949,191 B1 | 9/2005 | Petrone | |
| 6,984,323 B2 * | 1/2006 | Khudenko | C02F 3/282 |
| | | | 210/603 |
| 7,077,959 B2 | 7/2006 | Petrone | |
| 7,156,986 B2 | 1/2007 | Warrow | |
| 7,811,449 B2 * | 10/2010 | Warrow | C02F 3/082 |
| | | | 210/151 |
| 8,043,506 B2 | 10/2011 | Frankin et al. | |
| 2010/0187187 A1 * | 7/2010 | Choi | C02F 3/1284 |
| | | | 210/758 |
| 2012/0031835 A1 | 2/2012 | Gommel et al. | |
| 2012/0085690 A1 | 4/2012 | Hass | |

FOREIGN PATENT DOCUMENTS

| | | |
|---|---|---|
| EP | 0552496 | 7/1993 |
| MX | 2008008724 | 10/2008 |
| MX | 2007013635 | 4/2009 |
| MX | 2011004708 | 8/2011 |

* cited by examiner

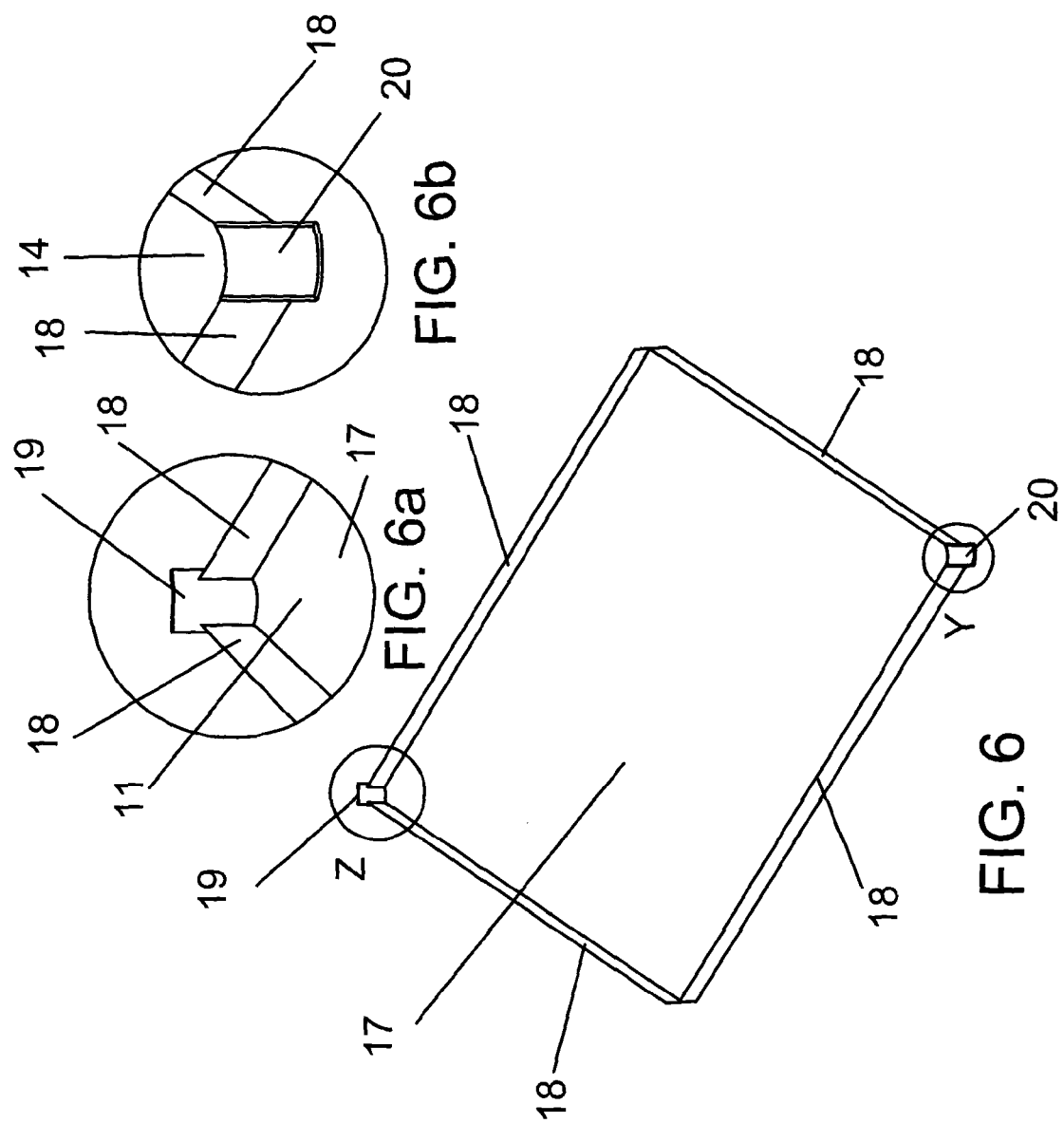

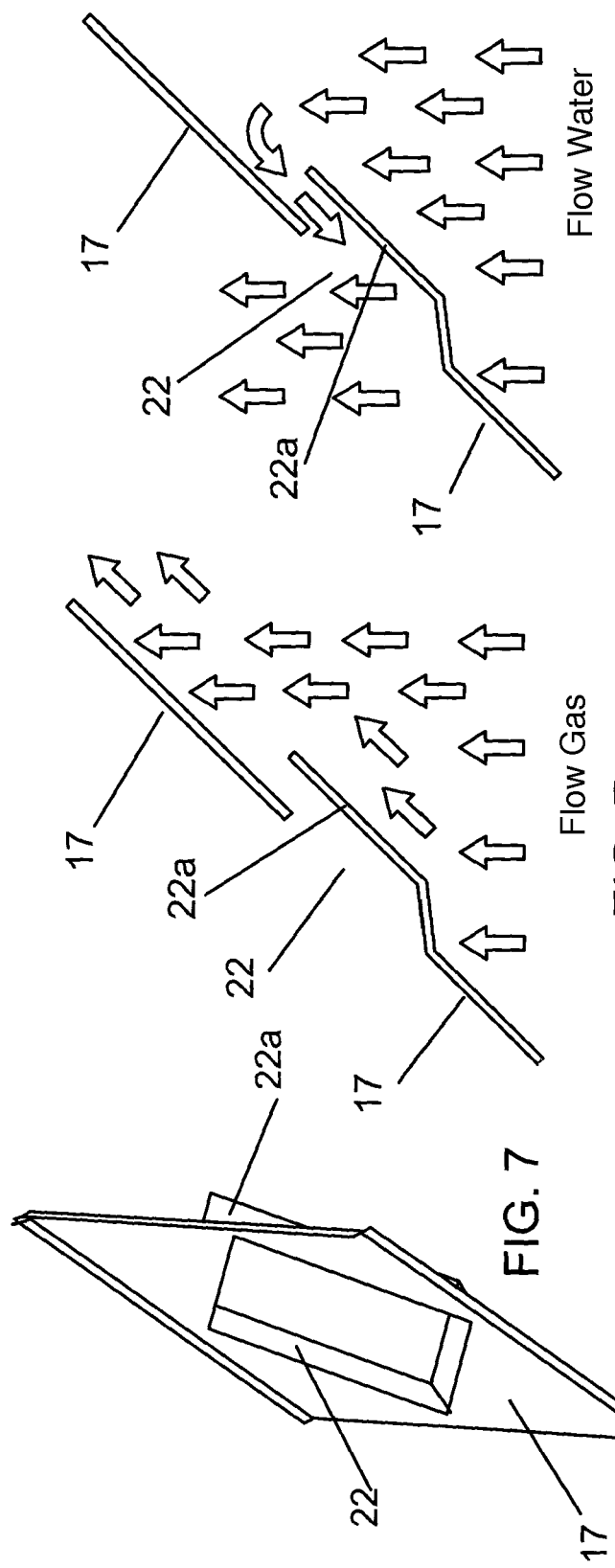

COMBINED BIOREACTOR FOR THE TREATMENT OF WASTE WATER, BY MEANS OF ANAEROBIC, AEROBIC AND ANOXIC PROCESSES OF DEGRADATION OF ORGANIC MATTER WITH ZONE SEPARATOR SYSTEM AND COLLECTION OF BIOGASES, SCUM AND SLUDGE

CROSS-REFERENCE TO RELATED APPLICATION

This application is the U.S. national phase of PCT Application No. PCT/MX2012/000138 filed on Dec. 19, 2012, which claims priority to Mexican Patent Application MX/a/2012/002707 filed Mar. 2, 2012, the disclosures of which are incorporated in their entirety by reference herein.

FIELD OF THE INVENTION

The present invention lies in the field of treatment, sanitation and decreasing of the pollutant organic load from wastewaters; more specifically relates to a Bioreactor, which jointly incorporates anaerobic, aerobic and anoxic digestion processes of organic matter from wastewater for sanitation, and including a new system of zone separation and collection of biogas, scum and sludge.

BACKGROUND OF THE INVENTION

Biological processes, anaerobic, aerobic and anoxic are widely used in the treatment of wastewater, however, in most plants applying various treatments two or more tanks are used separately, one for aerobic process and one for anaerobic process, which involves the use of a large area of land.

In the market is known a tank for the wastewater treatment, which removes the organic compounds by a biological treatment of a first anaerobic stage in a lower zone and a second aerobic stage in the upper zone. This tank known as UBOX® is a reactor having two sections: the lower part comprises an anaerobic section, and the upper part an aerobic section. The wastewater is fed into the lower section which is pre-treated anaerobically, using the upflow anaerobic process UASB (Upflow Anaerobic Sludge Bed); the middle section comprises a separation module in three phases to collect and separate the produced biogas and also functioning to maintain the sludge in the bottom of the reactor; on the gas separation and collection module is disposed a plurality of air nozzles through which air is introduced to improve the aerobic degradation of the remaining OCD (Oxygen Chemical Demand). An efficient separator in the upper part of the tank allows the effluent discharge and prevents the exit of the activated sludge, while preventing air bubbles interfere with the sedimentation process.

UBOX® system combines the two processes in a single tank, using an aerobic process in the upper part; but requires aerators, which means high energy consumption and the removal of the organic load is not as efficient, so that sanitation is not the optimal.

In the prior art was found the U.S. Pat. No. 4,692,241 to John L. Nicholson dated on Sep. 8, 1987 which discloses biological rotors for wastewater treatment; in this patent is disclosed in FIG. 1 a lower sedimentation tank 10 with a biozone 20 and a final sedimentation tank 30. The sedimentation tank 10 is an anaerobic zone where sedimentation, sludge accumulation and digestion thereof occurs, after that slightly above there is a transition zone and at the upper part is the biozone or ventilation zone 20 comprising a cover or lid 21 located at the upper part of the lower sedimentation tank 10 and housing a biological contact rotor 22, the rotor has a shaft 25 which is rotated by a motor 23; the biological rotor surface is covered with a thin layer of biomass which is often exposed to the atmosphere while the rotor rotates. Microorganisms that naturally occur in the wastewater feed multiply very rapidly in cyclic periods submerged and exposed to which they are subjected in the rotor surface. The microorganisms decompose rapidly biomass layers.

Water is fed through an opening of the cover or lid 21 which protects the upper part of the biological rotor, and water at the end of the travel through the biological rotor is finally passed to the final sedimentation tank 30 or clarifier tank, where there is less sedimentation and wherein said tank 30 comprises means for recirculating the biomass or sludge from said tank 30 to the tank 10.

In this patent, the tank does not include means for separate a completely anaerobic zone by a separator system from the transition or anoxic zone and which allows the biogas and scum collection from the anaerobic zone and the sludge from the transition or anoxic zone.

U.S. Pat. No. 7,156,986 B2 to Theodore U. Warrow dated on Jan. 2, 2007 was found, which protects a rotating biological contactor, which comprises a first deep clarifier tank 12 where a sedimentation takes place and there is an anaerobic digestion; the tank comprises a semicircular cover on the upper part that separates an anaerobic zone from an aerobic zone, the area above said cover (see FIG. 2) defines a ventilation area where the rotor is driven; the tank comprises an inlet 14 where the wastewater to be treated is discharged and where sedimentation takes place; the clarified water and from which sludge and sediments were removed, is passed through a inlet (see FIG. 3) to the ventilation upper part, where aerobic bacteria have action and the rotor assists in aeration and ventilation to favor the bacterial growth and that they can digest the organic load; this tank presents an anaerobic process and an aerobic process; the water passes through the rotor circuit which is divided into 4 stages where pass the water and at the end is discharged into a clarifier tank.

Like the earlier patent, it is not disclosed or suggested an additional separator of the purely anaerobic zone, or a biogas recovery system that allows collecting and recovering the gas for reuse; nor disclosed or suggested a scum collection system or sludge collecting from the additional transition zone.

It also found the U.S. Pat. No. 7,077,959 B2 to Richard J. Petrone dated on Jul. 18, 2006, which protects a unit of wastewater treatment comprising an inlet 11 to a completely sealed tank 12; in the upper part comprises a reservoir 20 separated from the tank 12 by a bottom wall; in such reservoir a rotary digester 24 is disposed. A second upper reservoir 22 as clarifier unit is disposed in the upper part of the tank; the tank 12 comprises a partitioning wall 46 which divides it into two tanks, the collection tank 13 where the solid are precipitated and in presence of anaerobic bacteria allows a preliminary digestion of organic matter. A secondary tank 15 attached to the tank 13 and separated by the wall 46 receives by decantation the water from the tank 13 and the water in said tank 15 is fed to the reservoir 20 where the rotary digester is disposed, which is immersed 30 to 50% of its diameter where digestion of organic matter in an aerobic process is accelerated; the water after passing through the biological digester pass to the clarifier reservoir 22 and if still found sediment, they are pumped into the tank 13. The clarified and purified water is passed through a disinfection base 56 with UV rays from UV bulbs 54; the UV light destroys microscopic residual microorganisms; alternatively a disinfection bulb or chlorination unit is used.

This tank is divided into two tanks by means of a partitioning wall and a third tank is required to complete the process. Like the earlier patent, it is not disclosed or suggested an additional separator of the purely anaerobic zone, or a biogas recovery system that allows collecting and recovering the gas for reuse; nor disclosed or suggested a scum collection system or sludge collecting from the additional transition zone.

U.S. Pat. No. 5,395,529 to James P. J. Butler dated on 7 Mar. 1995, was found, which discloses an apparatus for wastewater treatment, consisting of a tank comprising an input port 1 and an output port 8; a first zone 3 of solids settling from wastewater below the level of the inlet port 1; a second zone 7 of solids settling below the level of the output port 8; and a compartment 14, such that the first sedimentation zone 3 is in communication with the compartment 14 and said compartment 14 is in communication with the second sedimentation zone 7. Biological contact rotor 4 is mounted to rotate in the compartment 14. In this patent, both anaerobic and aerobic processes for wastewater treatment are executed; like the earlier patent, it is not disclosed or suggested an additional separator of the purely anaerobic zone, or a biogas recovery system that allows to collect and recover the gas for reuse; nor disclosed or suggested a scum collection system or sludge collecting from the additional transition zone. The design and configuration of the tank, does not allow a continuous and efficient process of wastewater sanitation.

In Mexico was found the patent application MX/a/2007/013635 to Leticia Montoya Herrera et al. filed on Oct. 31, 2008, which discloses a purification apparatus for wastewater treatment from agribusiness called duplex anaerobic reactor consisting of two similar tanks connected in series. Each tank has attached at the upper part a truncated conical part with 60° angled walls. This has an inverted hood with 60° walls, called biogas separation chamber, including at least one scum collection and dislodge hood outside each tank by means of a pipe.

It also has a circular distributor, formed of evenly distributed sections, each section is attached by one or more tubes that descend fastened to the bottom of the tank. At the upper part each tank has a sedimentation chamber for separation of treated water and sludge, and attached to it a peripheral sink which in turn has an annular collector channel of treated water with at least one pipe which connects the two tanks to provide the wastewater feed into the second tank distributor for further treatment. With this duplex anaerobic reactor, efficiencies of at least 80% of removal are obtained in wastewater treatment from agribusiness with OCD values greater than 5000 mg/l.

Also is cited as reference the patent applications MX/a/2011/004708 and MX/a/2008/008724.

Was not found in any of the above mentioned documents, a combined bioreactor for wastewater treatment by means of anaerobic, aerobic and anoxic processes of degradation of organic matter which integrally comprises a collection system of biogas, scum and sludge in a practical, efficient and functional manner, and in the same reservoir allows the execution of anaerobic, aerobic and anoxic digestion with the possibility of sanitize wastewater, achieving a removal efficiency of OBD (oxygen biological demand) and TSS (total suspended solids) greater than 95%, besides a nitrification process. Where the collected biogas can be used as fuel to preheat the input current or as feedstock for cogeneration of energy that can be used in the process in the same plant or for any other purpose.

OBJECTIVES OF THE INVENTION

The main objective of the present invention is to make available a bioreactor which allows to perform both an anaerobic degradation, as an aerobic degradation as well as the anoxic degradation of organic matter from wastewater, and at the same time comprises means for separate stages, capture and collect the biogas produced in the anaerobic digestion; as well as collection of sludge and scum; while allowing aeration in the upper zone by means of a biological contact rotor; and thus allows the wastewater sanitation, achieving a removal efficiency of OBD (oxygen biological demand) and TSS (total suspended solids) greater than 95% and nitrification and denitrification process.

Another objective of the invention is to enable said bioreactor for anaerobic, aerobic and anoxic digestion of organic matter from wastewater and collection system of biogas, scum and sludge, which also enables the use of biogas as a fuel for electric power generation by a electric generator coupled to a combustion engine where the residual engine heat can be used to preheat the plant influent, provided that the temperature of the water to be treated never exceeds 40° C. and accelerate the digestion biological activities of the organic matter.

Another objective of the invention is to enable said bioreactor for anaerobic, aerobic and anoxic digestion of organic matter from wastewater and collection system of biogas, scum and sludge, which also implies a lower space requirement by comprising all the processes in a single bioreactor and using a biological contact rotor as aerobic process, the power consumption is minimized, this being one of the processes that has the lowest cost per cubic meter of treated water.

Another objective of the invention is to enable said bioreactor for anaerobic, aerobic and anoxic digestion of organic matter from wastewater and collection system of biogas, scum and sludge, which in addition to generating few sludge integrates a collection system thereof, both in the bottom of the anaerobic bioreactor, as in the bottom of the transition zone and in the bioreactor lower part of the aerobic rotor. Sludge from the aerobic zone is recycled to the transition zone, and the sludge from the transition zone to the anaerobic zone and in the anaerobic zone are stored for a period to allow its complete digestion so that the overall process produces only inert sludge and in very low amounts, this helping to facilitate the sludge collection process and reduce disposal costs thereof.

Another objective of the invention is to enable said bioreactor for anaerobic, aerobic and anoxic digestion of organic matter from wastewater and collection system of biogas, scum and sludge that also do not produce perceptible unpleasant odors at the plant.

Another objective of the invention is to enable said bioreactor for anaerobic, aerobic and anoxic digestion of organic matter from wastewater and collection system of biogas, scum and sludge that also has the possibility of energy cogeneration through the production and collection of biogas; which allows a better separation of the anaerobic aerobic and anoxic sections, through the use of polyhedral separators of biogas collection zones, further defining a barrier to the formation of scum on upper part of bioreactor, the collection of sludge produced and also serves to prevent its passage to the following plant processes.

And all those qualities and objectives which will become apparent when performing a comprehensive and detailed description of the present invention supported by the illustrated embodiments.

SUMMARY OF THE INVENTION

Generally, the bioreactor for anaerobic, aerobic and anoxic digestion of organic matter from wastewater and collection system of biogas, scum and sludge, in accordance with the present invention consists of a tank of substantially rectangular shape with a minimum depth of 7 m, which is divided into three zones; an anaerobic zone at bottom, an anoxic or transition zone in the middle and an aerobic zone in the upper part; at least one wastewater feed duct disposed at the upper part of the anaerobic zone. This zone is characterized by the absence of oxygen, which promotes the degradation of organic matter contained in the wastewater; by means of this degradation, small amount of sludge is generated, which is settled at the bottom, leaving a sufficient period of time for digestion and subsequently extracted by means of a specially designed piping, located on the tank bottom. This piping may be from PVC, stainless steel, high density polyethylene or any other material with corrosion resistance to enable a service life of at least 50 years, of sufficient diameter for its function, and a thickness that prevents collapse even with water load from outside and a total vacuum inside. It is placed about 10 cm from the tank bottom so that it has collection area through holes evenly distributed on the bottom. This pipe is distributed along the bioreactor, allowing cover the entire area of sedimentation. Each tube has holes of different diameters ranging typically from 19.05 mm to 38.1 mm (¾" to 1½"). Smaller holes are at the closest side to the suction and grow as advances to the opposite end, so that the suction is uniform along the tube.

In the bottom of the bioreactor, the degradation process of organic matter occurs by the action of anaerobic bacteria called methanogens, as its name indicates, these bacteria produce methane and carbon dioxide ($CH_4$ and $CO^2$) which is called biogas; this biogas is lightweight so that it has an upward flow within the tank.

To prevent escape and to take advantage of biogas, the bioreactor or tank has a intermediate polyhedral separator panel with a special configuration of rhomboids to collect biogas, sludge and scum, which joined together form a intermediate polyhedral separator panel attached and supported on a plurality of intermediate columns and beams implemented in the tank; said separators joined together define a plurality of conical collectors with upper connecting nozzles of ducts from a network of capture and conduction of biogas and a plurality of funnel-shaped manifolds with lower connecting nozzles of ducts defining a network of capture and conduction of sludge from the anoxic zone.

Said intermediate polyhedral separator panel separates the anaerobic zone from anoxic zone; in which said separators are made from a corrosion resistant sheet material and sufficiently stiffness to support the sludge weight and the gas floating efforts as would be the Fiberglass Reinforced Polyester (FGRP), stainless steel and other material that resist corrosion for at least 50 years.

Each of said plurality of conical collectors of biogas and scum and said plurality of sludge collecting funnels of said intermediate polyhedral separator panel is formed from four substantially rhomboid shaped straight parts comprising respective connecting perimeter flanges, to be attached with adjoining similar parts, inclined at 45 to 60°, with clamping means and sealing elements between each other to form said intermediate polyhedral separator panel. These parts have at the upper part a flange of quarter of circle, so that when four parts are attached forming a cone to collect gas and scum, said flanges define an upper cylindrical nozzle where a gas and scum collection tube from anaerobic process is inserted; in the same way it is obtained a similar finish at the bottom, so that once attached the four parts, forming a funnel to collect sludge, said flanges define a lower cylindrical nozzle where it is possible to connect the tubes to collect sludge from the anoxic or transition process.

Parts from the end opposite to the area where the raw water feed duct is disposed, have openings for water to reach the upper part of the anaerobic tank, i.e., the anoxic or transition zone, the surface of the openings must have a combined area so that the water velocity through the passage, at plant maximum flow ranges between 0.05 and 0.15 meters per second. These openings are covered at the lower part by a baffle of the same material with a similar slope to the intermediate polyhedral separator panel so as to prevent the upward flow of gas bubbles, while allowing the water flow through the opening into the next anoxic or transition zone, so following the treatment process without water flow excess to the next zone.

The gas manifold height is between 1.5 and 2 m, at a depth between 5 to 7 m in the bioreactor and the overlap between the intermediate polyhedral separator panel and baffle must be between 10 and 20 cm, to prevent the upward flow of gas bubbles.

As previously mentioned, performing the assembly of all parts; in the upper and lower parts are generated upper and lower cylindrical outlets, where pipes from a piping network are connected which connect all upper outputs and sends the gas and scum to a device that is responsible for their separation and other network that connects the lower outputs and sends the settled sludge to the anaerobic zone of the tank to continue their digestion.

Then in said intermediate polyhedral separator panel defining a plurality of conical collectors to collect biogas and scum and each sludge collecting funnel has two pipes, one responsible for collection gas and scum which floats to the upper part of the intermediate polyhedral separator panel and another responsible for transferring the sludge which settles and accumulates in the lower part of the same, using gravity or pumping as transport medium, depending on the location of the external separator, these wastes will pass through a device that will be responsible for making the gas/sludge/scum separation (biogas); should be mentioned that the device responsible for the gas extraction, should have an estimate time for the release of the generated gas, passing it directly to a gas blender, using it as fuel for power generation of the same plant or for any other purpose.

The main process of the device is the sludge and scum sedimentation that will continue generating methane gas and carbon dioxide.

Once the water passed through the anaerobic section reaches the anoxic or transition zone, to this zone also reaches an amount of recirculation water coming from the aerobic zone. This mixture creates a minimum oxygen concentration which is rapidly consumed creating an anoxic environment which allows the growth of denitrifying bacteria that convert the nitrates and nitrites from the recirculation stream to gaseous nitrogen in presence of carbon compounds contained in the wastewater.

The upper section of the bioreactor is the aerobic zone, comprising at least one biological contact rotor BCR, which is a polyethylene disk or other material with similar properties of 5.5 m in diameter which rotates about an axis by the action of a motor, remaining in contact with air and water from the anoxic zone. The BCR in the early stages makes the degradation of organic matter remaining from the water and in the final stages allows the growth of different nitrifying bacteria (Nitrosomonas and Nitrobacter) that convert ammonia nitrogen (NH4) to nitrites (NO2) and then into nitrates (NO3), which as explained above, they will be transformed into nitrogen gas in the anoxic zone through a process known as denitrification. Underneath said biological contact rotor, are disposed semicircular plates that separate the aerobic zone from the anoxic zone.

Through these processes, the wastewater treatment and pollutant organic load reduction is achieved by more than 95%.

Moreover the invention has other kind of sludge extraction pipe, it is located in the lower part of the biological contact rotor connected to semicircular plates that separate the aerobic zone from the anoxic zone, so that the biomass detached from the discs does not accumulate in said plates, but it is extracted through said pipe and recirculated to the anoxic zone, where a part is degraded and another settled out in the intermediate polyhedral separator panel of sludge collection from said zone.

In another embodiment of the invention, said intermediate polyhedral separator panel comprises reinforcing elements disposed beneath and supported on said intermediate columns and beams.

To better understanding of the features of the invention are attached to this description as an integral part thereof, drawings with illustrative but not limiting character, below described.

BRIEF DESCRIPTION OF THE FIGURES

FIG. 6 shows a elevation conventional perspective view of a rhomboid shaped straight modular part for forming the intermediate polyhedral separator panel as element to capture and collect biogas produced in the anaerobic digestion; as well as scum collection.

FIG. 6a illustrates an enlarged view of the "Z" upper part of the part shown in FIG. 6.

FIG. 6b illustrates an enlarged view of the "Y" lower part of the part shown in FIG. 6.

FIG. 7 illustrates a conventional perspective view of straight parts forming the intermediate polyhedral separator panel comprising openings for the passage of water and baffles regulating passage of gas and water.

FIGS. 7a and 7b illustrate side views of a straight part forming the intermediate polyhedral separator panel, comprising openings for the passage of water and the baffles regulating passage of gas and water.

Figure 1:
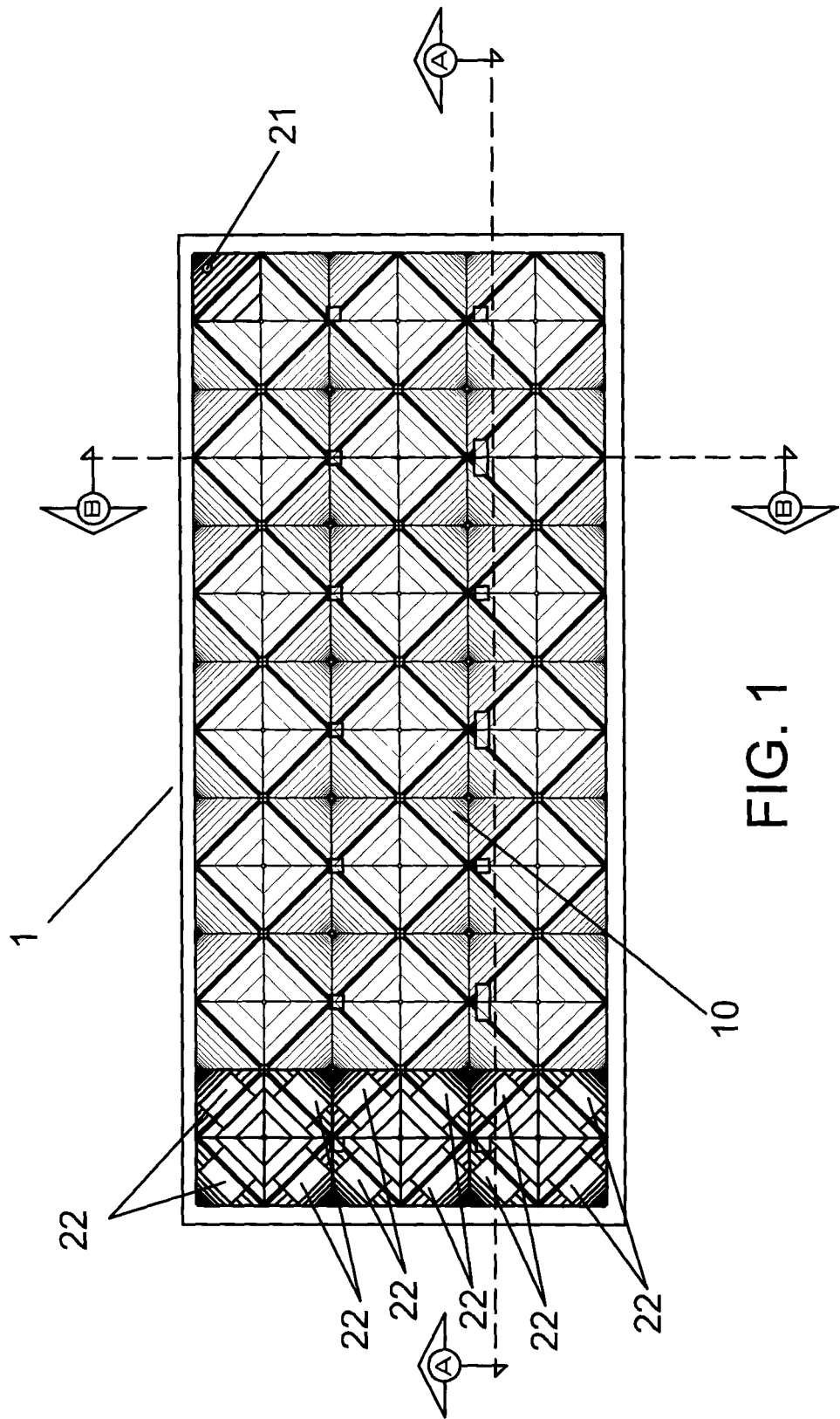
FIG. 1 shows a plan view of a bioreactor for anaerobic, aerobic and anoxic digestion of organic matter from wastewater and collection system of biogas, scum and sludge, in accordance with the present invention, not illustrating the biological contact rotors.
Figure 2:
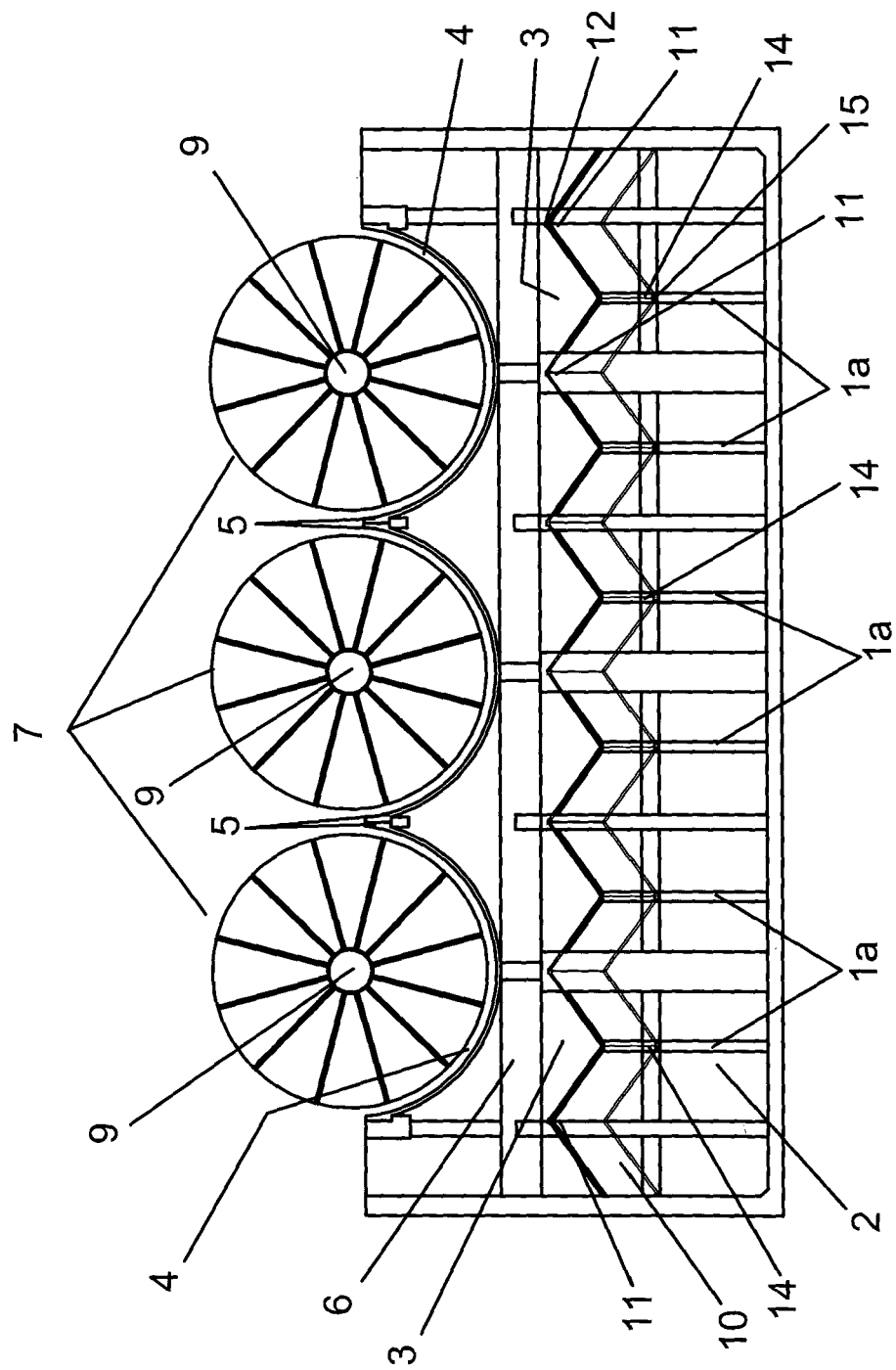
FIG. 2 shows a front view of section A-A illustrated in FIG. 1, of the bioreactor for anaerobic, aerobic and anoxic digestion of organic matter from wastewater and collection system of biogas, scum and sludge.
Figure 3:
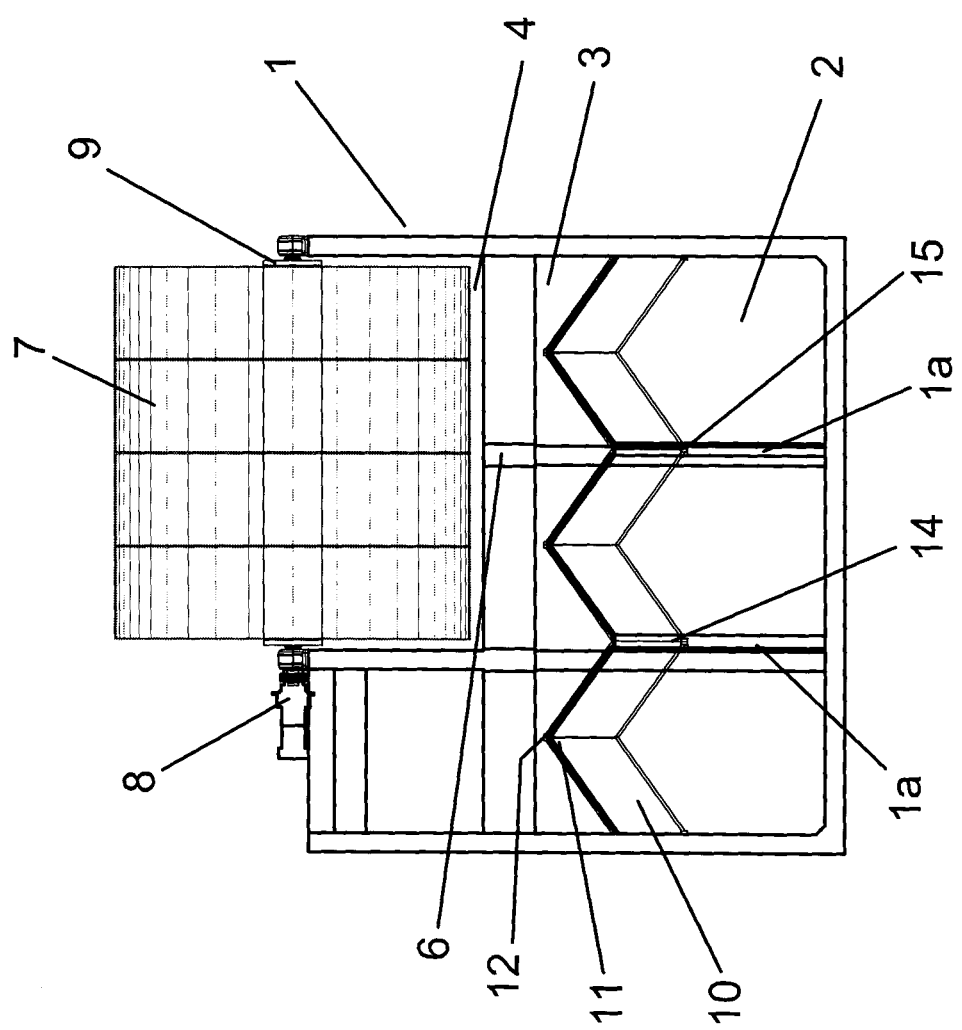
FIG. 3 shows a side view of the section B-B illustrated in FIG. 1, of the bioreactor for anaerobic, aerobic and anoxic digestion of organic matter from wastewater and collection system of biogas, scum and sludge.
Figure 4:
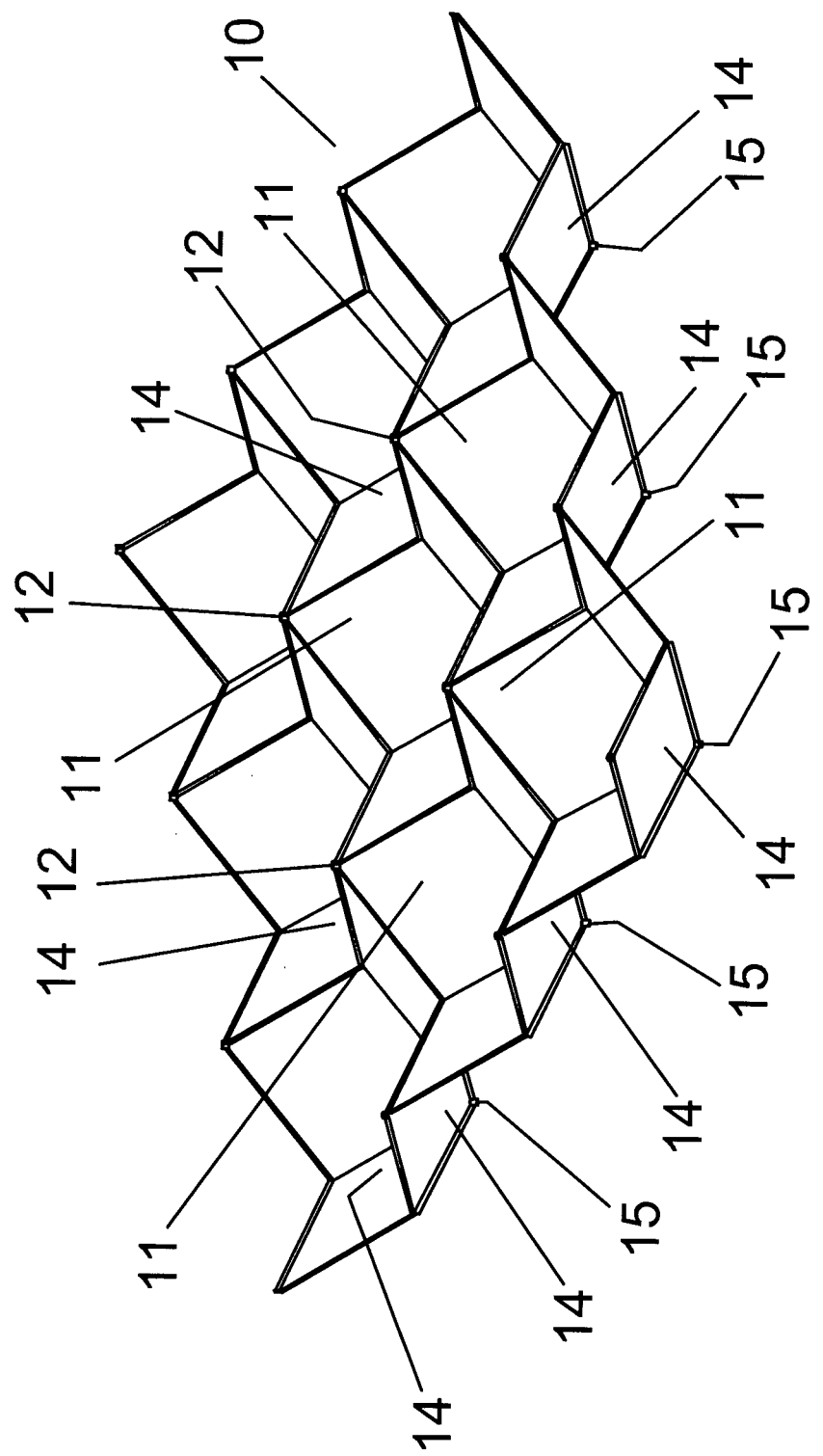
FIG. 4 shows a conventional perspective view of the intermediate polyhedral separator panel (without detail of upper and lower tubes) as an element to capture and collect biogas and scum produced in anaerobic digestion; and sludge from the anoxic zone.

For a better understanding of the invention, it will make a detailed description of any of the embodiments thereof shown on the drawings, which are annexed to the present disclosure for illustrative but non-limiting purposes.

DETAILED DESCRIPTION OF THE INVENTION

The characteristic details of the bioreactor for anaerobic, aerobic and anoxic digestion of organic matter from wastewater and collection system of biogas, scum and sludge, are clearly shown in the following description and the annexed drawings illustrative, serving the same reference signs to indicate the same parts.

Referring to FIGS. 1 to 3 and 8, the invention comprises a bioreactor 1 of substantially rectangular shape with a minimum depth of 7 m, which is divided into three zones; an anaerobic zone in the bottom 2 characterized by the oxygen absence, which promotes the degradation of the organic matter contained in wastewater; by means of this degradation, small amount of sludge is generated, which settles at the bottom and subsequently extracted through a perforated pipe 2a (FIG. 8) located on the bottom of bioreactor. The organic matter degradation process occurs by the action of anaerobic bacteria called methanogens, as its name indicates, these bacteria produce methane and carbon dioxide ($CH_4$ and $CO_2$), which is called biogas; this biogas is lightweight so it has an upward flow within the tank; anoxic or transition zone in the medium 3 where the water from the anaerobic zone comes along with a quantity of recirculating water that comes from an aerobic zone 4, creating a mixture that originates a minimum oxygen concentration that is rapidly consumed creating an anoxic environment, which allows the growth of denitrifying bacteria to convert the nitrates from the recirculating stream into gaseous nitrogen in presence of carbon compounds contained in the wastewater and an aerobic zone 4 at the upper part, separated from the anoxic zone with semicircular plates 5 supported on a beam 6, where are disposed one or more biological contact rotors 7, as needed, which consist of a polyethylene or polypropylene disk of up to 5.5 m diameter (which may be greater) where multiple biofilm sheets are supported and rotate by the action of a motor 8 about an axis 9, remaining in contact with air and water from the anoxic zone. Biological contact rotors 7 in the early stages performs the degradation of organic matter remaining in the water and in the later stages enable the growth of different nitrifying bacteria (nitrosomonas and nitrobacter) converting ammonia nitrogen into nitrites and then into nitrates as already explained above will be transformed into nitrogen gas in the anoxic zone.

In the bottom of said anaerobic zone 2 is comprised at least one feeding duct of wastewater (not shown) near the upper part.

To prevent the biogas escapes from anaerobic zone 2 and can be take advantage thereof, the tank has a plurality of rhomboid shaped parts to collect biogas, which joined together form a intermediate polyhedral separator panel 10 attached and supported by a plurality of intermediate columns 1a implemented in the bioreactor 1.

Referring to FIGS. 2 to 5a, said separators attached together to form the intermediate polyhedral separator panel 10 define a plurality of conical collectors 11 with connecting nozzles 12 of ducts from a capture and conduction network of biogas and scum 13 and a plurality of funnel-shaped manifolds 14 with connecting nozzles 15 of ducts 16 that define a capture and conduction network of sludge.

Said intermediate polyhedral separator panel 10 separates the anaerobic zone 2 from the anoxic or transition zone 3; wherein said separator is preferably made of GFRP (fiberglass reinforced polyester) or any other material of similar properties.

Figure 5:
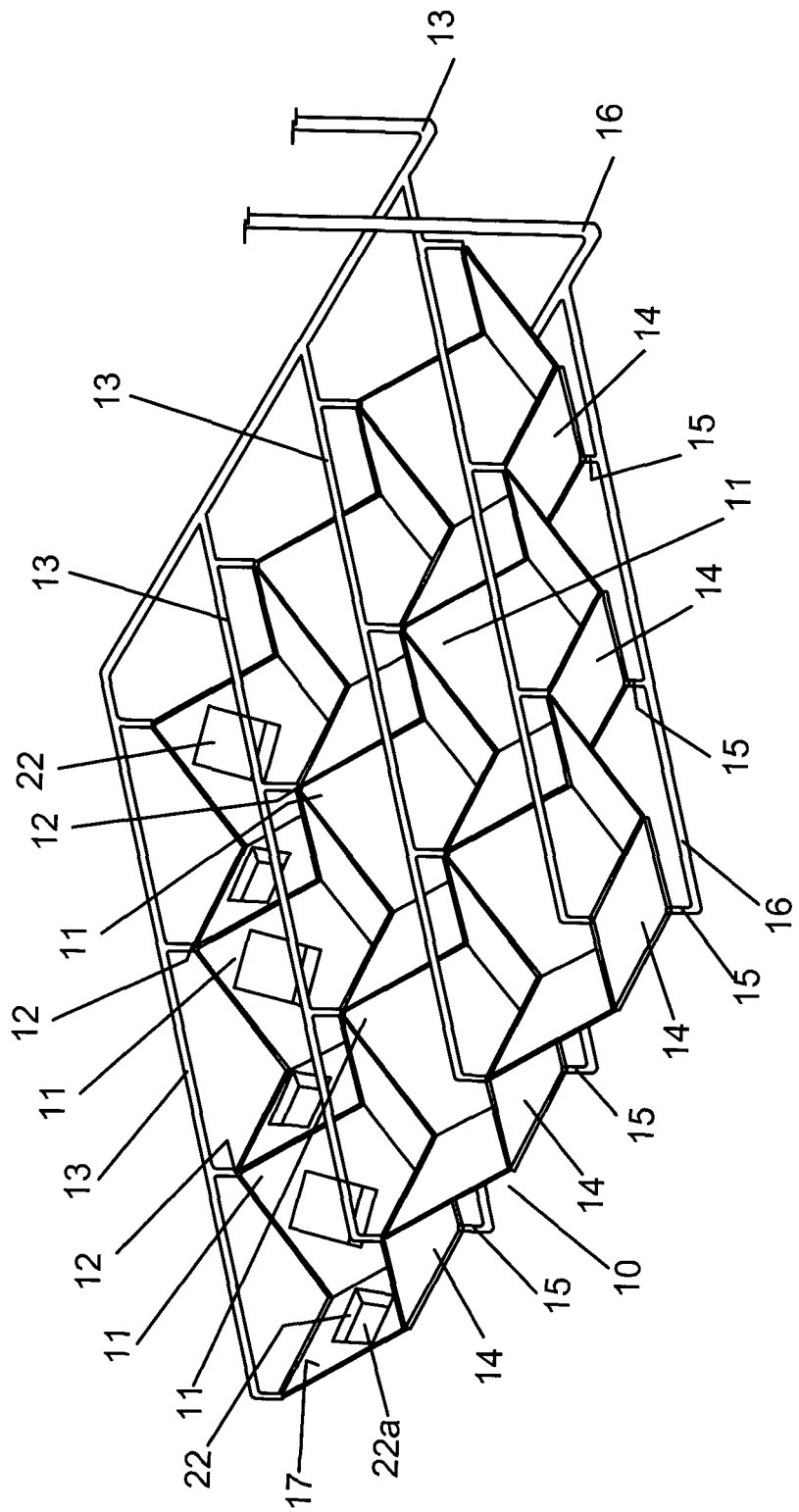
FIG. 5 shows a conventional perspective view of the intermediate polyhedral separator panel with piping network to capture and collect biogas and scum produced in the anaerobic digestion; as well as the piping network for sludge collection from anoxic zone.
Figure 5A:
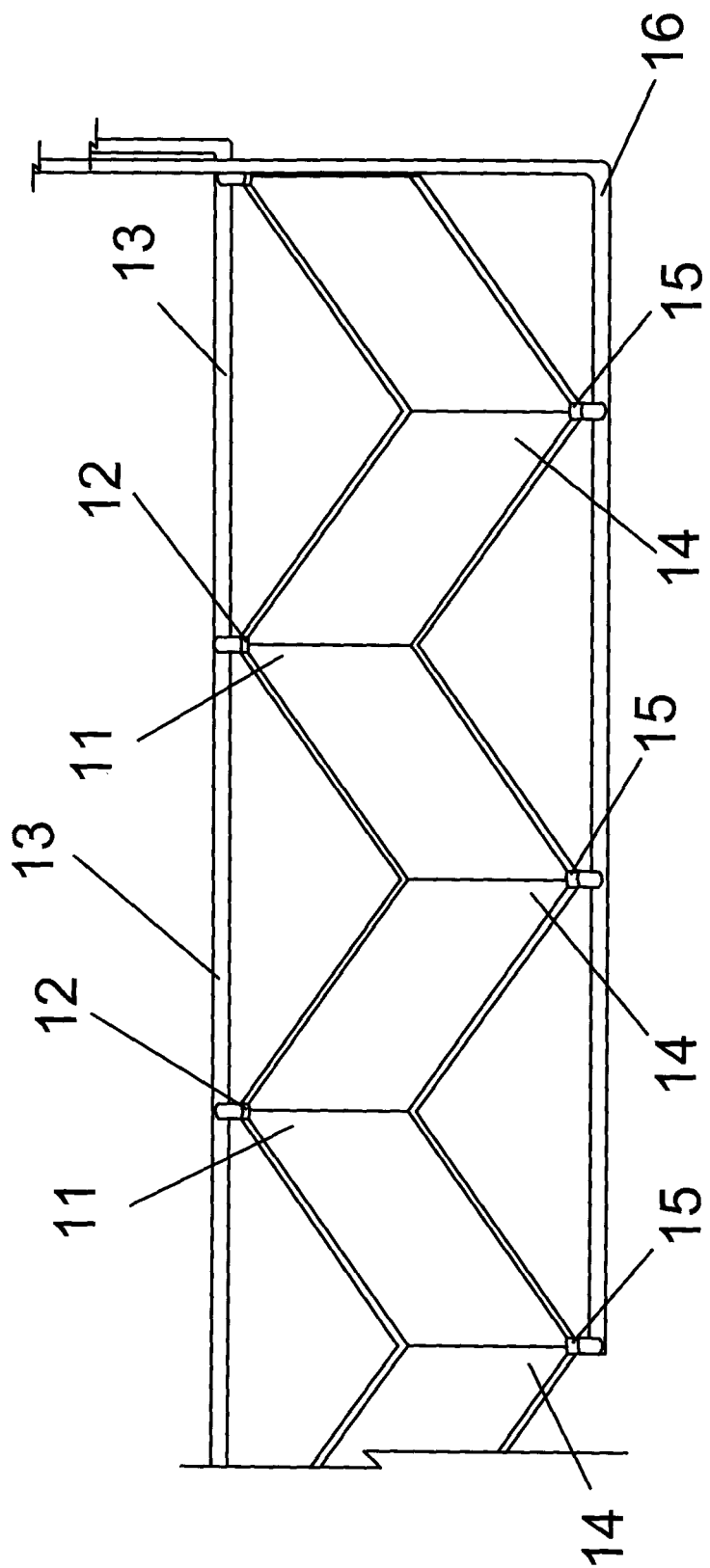
FIG. 5a illustrates a side view of intermediate polyhedral separator panel illustrated in FIG. 5.

Referring to FIGS. 6 to 6b, and returning to reference of FIGS. 5 and 5a, the conical collectors 11 and the funnel-shaped manifolds 14 are formed by four substantially rhomboid shaped straight parts 17 which comprise respective connecting perimeter flanges 18 to be attached with adjoining similar parts, inclined at 45 to 60° respect to the horizontal and engaged by means of said flanges fastened with clamping means and sealing elements (not shown) for forming said intermediate polyhedral separator panel 10. These straight parts 17 with conical configuration in the upper part have an upper flange of quarter of circle 19, so that when four parts are attached form a gas and scum conical collector 11, such flanges defining an upper cylindrical connecting nozzle 12 (see FIGS. 5 and 5a) where it is possible to connect the gas and scum collection pipes of the biogas capture and conduction network 13, in the same way it is obtained a similar finish at the bottom with a lower flange of quarter of circle 20, so that the four parts joint together, form a sludge collecting funnel 14 (see FIGS. 5 and 5a), said flanges defining a lower cylindrical connecting nozzle 15 where it is possible to connected the ducts for collecting sludge 16.

In FIG. 1, a hole 21 is shown in a corner of the intermediate polyhedral separator panel 10 for the water inlet and at the opposite end comprises openings 22 so that the water reaches the upper part of the bioreactor; the surface of the openings must be such that water velocities above mentioned are retained. These openings are covered at the lower part by a baffle 22a) from the same material with similar slope to the intermediate polyhedral separator panel so as to prevent the upward flow of gas bubbles, while allowing the water flow through openings 22 into the next anoxic or transition zone, thus being able to follow the treatment process without excess of water flow to the next zone.

In FIGS. 5 and 7 are shown the baffles 22a fixed in some of the straight parts 17 forming the intermediate polyhedral separator panel 10, precisely the parts 17 of the end part; said baffles 22a being disposed just below the openings 22, which are disposed with similar slope to that of said straight parts 17 so as to prevent the upward flow of gas bubbles, while allowing the water flow through the apertures 22. In FIGS. 7a and 7b are shown side views of parts 17 from the end part of said intermediate polyhedral separator panel with the arrangement of the baffles 22a disposed on the lower side in the zone where said openings 22 are disposed; these illustrations enable appreciate the flow followed by the biogas into the conical collector of gas and scum 11 (see FIG. 5) and the course followed by the water into the anoxic or transition zone 3 (see FIG. 2).

Figure 8:
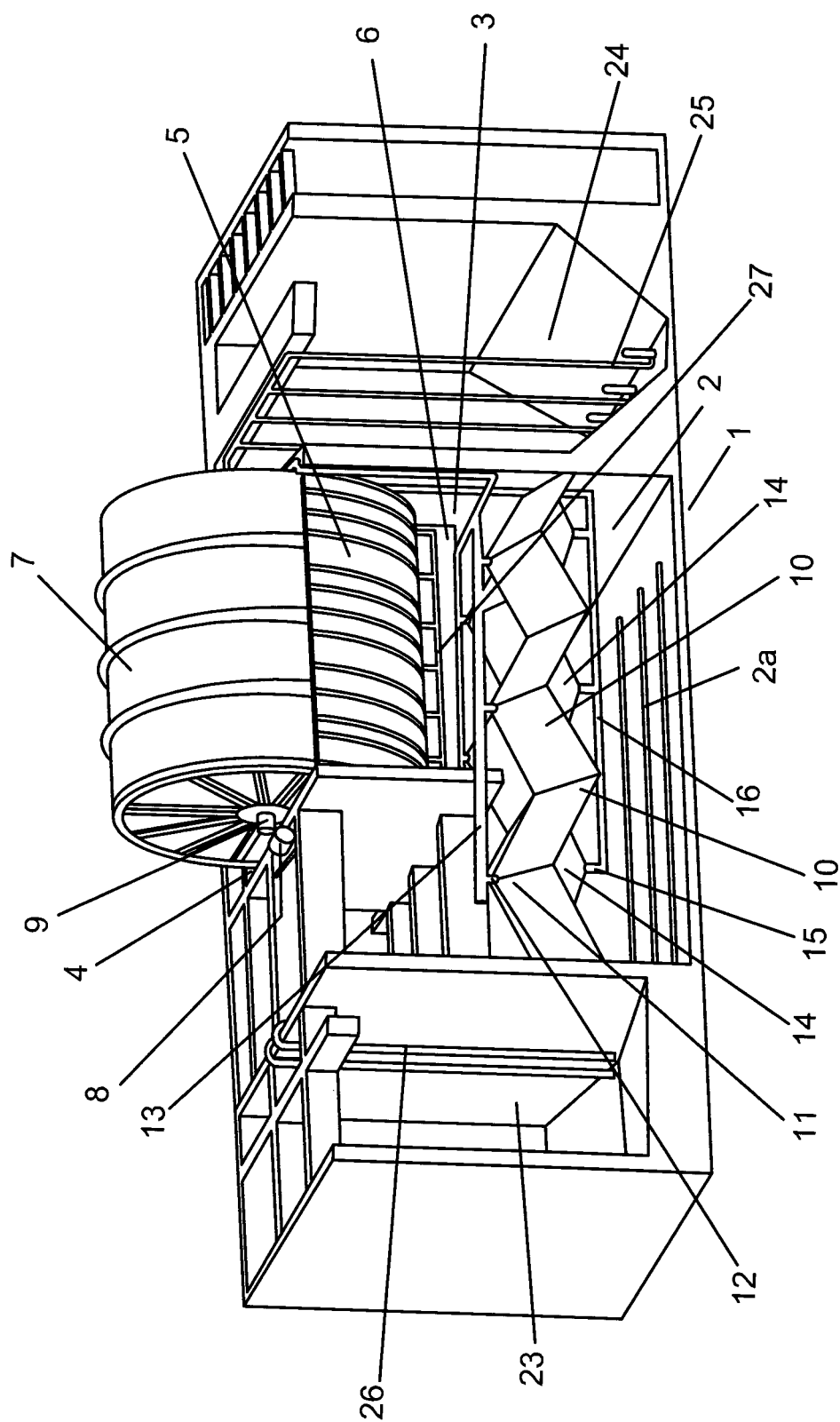
FIG. 8 shows a conventional perspective view of one embodiment of the bioreactor for anaerobic, aerobic and anoxic digestion of organic matter from wastewater and collection system of biogas, scum and sludge.

Referring to FIG. 8, the bioreactor 1 may also be designed in another preferred embodiment thereof with a homogenization tank 23 attached to the bioreactor 1, wherein the flow and organic load supplied to the bioreactor 1 is uniformed to be dosed at the bottom thereof through a pipe of raw water supply 26; in the output of the treated water after passing through the biological contact rotors 7 a removal efficiency of OBD (oxygen biological demand) and TSS (total suspended solids) is achieved greater than 95%; the water passes by means of overflow to a second final clarifier tank 24 of bottom with chamfered walls to encourage sedimentation of biomass detached from biological contact rotors 7, comprising pumps and ducts of biomass recirculation 25 in the bottom toward the anoxic zone 6. The clarified and purified water is passed through disinfection means with UV rays (preferably), ozone or chlorine to destroy residual microorganisms. In either disinfection methods must be sure the contact times required to each method performs its function.

FIG. 8 shows clearly the perforated pipe 2a (FIG. 8) that is located in the bottom of the bioreactor near the bottom of the anaerobic zone 2; also it is seen the plurality of rhomboid shaped parts for biogas collection, which join together form a intermediate polyhedral separator panel 10 that define a plurality of conical collectors 11 with connecting nozzles 12, of ducts from a capture and conduction network of biogas and scum 13 toward the gas collector and a plurality of funnel-shaped manifolds 14 with connecting nozzles 15 of ducts 16 that define a sludge capture and conduction network.

Figure 9:
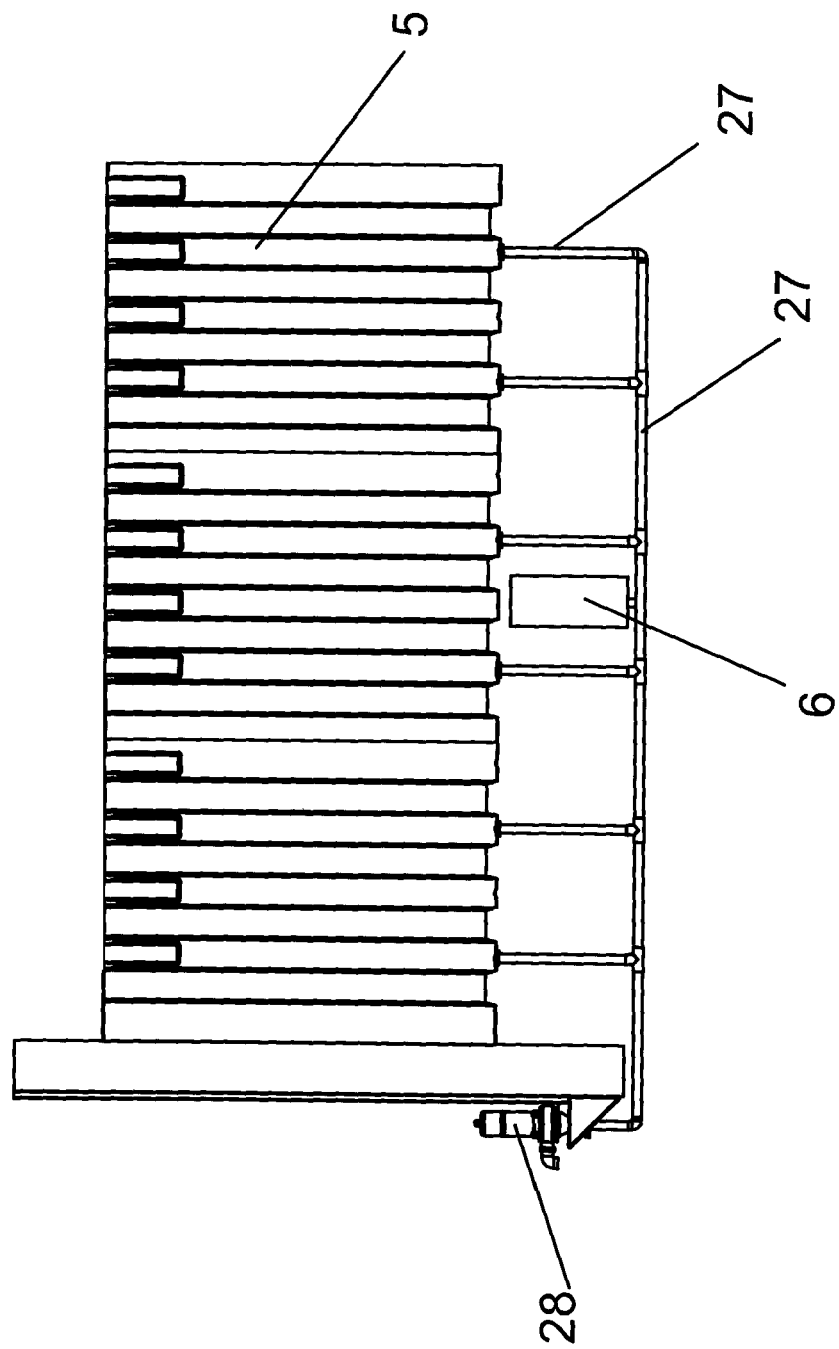
FIG. 9 shows a side view of a portion of the rotor and the semicircular bottom plates with sludge discharge duct from the aerobic zone.

Also may be seen in FIGS. 8 and 9 the semicircular plates 5 supported on a beam 6 below the at least one biological contact rotor 7 which separates the aerobic zone 4 in the upper part of the anoxic zone 3. Said semicircular plates collect the biomass loosened from the rotor and the residual sludge, and comprise connecting means of sludge discharge tubing 27 connected to a pump 28 to be recirculated into the anoxic zone 3, where a part will be degraded and another will be settled on the intermediate polyhedral separator panel 10 of sludge collection of such zone 3.

The invention has been sufficiently described so that a person of ordinary skill in the art may to reproduce and obtain the results mentioned in the present invention. However, any person with skill in the field of art to which pertains the present invention may be able to make modifications not described in the present application, however, if the implementation of these changes in a particular structure or in the manufacturing process of the same, requires the claimed matter in the following claims, such structures will be comprised within the scope of the invention.

What is claimed is:

1. A combined bioreactor for wastewater treatment, through anaerobic, aerobic and anoxic processes of organic matter degradation with zone separator system and biogas, scum and sludge collection, wherein the combined bioreactor comprises a tank divided into an upper aerobic zone, a middle anoxic zone and a lower anaerobic zone wherein, said lower anaerobic zone contains a feed duct where the wastewater to be sanitized enters the tank, and where the action of anaerobic bacteria, contained in said anaerobic zone, degrade organic matter present in said wastewater to produce biogas ($CH_4$ and $CO_2$) and a small amount of sludge which settles to the bottom of the lower anaerobic zone and which then is extracted through a perforated pipe located on the bottom of the bioreactor;

said anoxic zone, located between the lower anaerobic zone and upper aerobic zone, comprises water from the anaerobic zone together with a quantity of recirculation water from the aerobic zone, and contains a growth of denitrifying bacteria that convert nitrates from the recirculation stream to gaseous nitrogen in the presence of carbon compounds contained in the wastewater; and said upper aerobic zone comprises at least one biological contact rotor, wherein said rotor degrades organic matter remaining in the wastewater which passed through the bottom anaerobic and anoxic zones and further wherein-said rotor enables the growth of different types of nitrifying bacteria that convert ammonia nitrogen to nitrites and then to nitrates;

wherein said combined bioreactor further comprises a plurality of substantially rhomboid shaped separators for biogas, sludge and scum collection which when said rhomboid shaped separators are joined together form an intermediate polyhedral separator panel attached and supported on a plurality of intermediate columns and beams implemented in the tank; and further when said rhomboid shaped separators are joined together said rhomboid shaped separators define a plurality of conical collectors with upper connecting nozzles of ducts forming a biogas and scum capture and conduction network and a plurality of collecting funnels with lower cylindrical connecting nozzles of ducts forming a sludge capture and conduction network.

2. The combined bioreactor for wastewater treatment, through anaerobic, aerobic and anoxic processes of organic matter degradation with zone separator system and biogas, scum and sludge collection, according to claim 1, wherein said intermediate polyhedral separator panel is located at the interface of the anaerobic zone and the anoxic zone; wherein said separator panel is fabricated from corrosion resistant sheet material having sufficiently stiffness to support the weight of the sludge and the gas floating efforts as would be Fiberglass Reinforced Polyester (FGRP), stainless steel or other material that resists corrosion for at least 50 years.

3. The combined bioreactor for wastewater treatment, through anaerobic, aerobic and anoxic processes of organic matter degradation with zone separator system and biogas, scum and sludge collection, according to claim 1, wherein each conical collector to capture biogas and scum and each sludge collecting funnel of said intermediate polyhedral separator panel, are formed by four substantially rhomboid shaped straight parts comprising respective connecting perimeter flanges wherein clamping means and sealing elements are used to connect the flanges of adjoining substantially rhomboid shaped straight parts to each other at 45 to 60° inclines respective to the horizontal; wherein said substantially rhomboid shaped straight parts further comprising a quarter-circle at the upper and bottom corners of each rhomboid shaped straight part, so that when four parts are attached, an upper cylindrical nozzle is formed where it is possible to connect the tubes for collection of biogas and scum floating at the upper part of the intermediate polyhedral separator panel and which leads them to a device responsible for their separation and a lower cylindrical nozzle where it is possible to connect the tubes to collect settled sludge into the anaerobic zone of the tank to continue their digestion.

4. The combined bioreactor for wastewater treatment, through anaerobic, aerobic and anoxic processes of organic matter degradation with zone separator system and biogas, scum and sludge collection, according to claim 1, wherein said rhomboid shaped parts that make up said intermediate polyhedral separator panel are disposed at the opposite end of the lower anaerobic zone where the treated water feed duct is disposed, have openings for water to reach the upper part of the tank, the surface of the openings must have a combined area so that the velocity of the water passing through the openings ranges between 0.05 and 0.15 meters per second; and wherein said openings are covered at the bottom by a baffle of the same material with a similar slope to that of the intermediate polyhedral separator panel so as to prevent the upward flow of gas bubbles, and simultaneously allows water flow through the anoxic zone without excess water flowing into the next zone.

5. The combined bioreactor for wastewater treatment, through anaerobic, aerobic and anoxic processes of organic matter degradation with zone separator system and biogas, scum and sludge collection, according to claim 4, wherein the height of said intermediate polyhedral separator panel to collect and separate gas, sludge, and scum is between 1.5 and 2 m, at a depth of 5 to 7 m in the tank and the overlap between the intermediate polyhedral separator panel and the baffle is between 10 and 20 cm to prevent the upward flow of gas bubbles.

6. The combined bioreactor for wastewater treatment, through anaerobic, aerobic and anoxic processes of organic matter degradation with zone separator system and biogas, scum and sludge collection, according to claim 1, wherein said plurality of conical collectors of biogas and scum and said plurality of sludge collecting funnels of said intermediate polyhedral separator panel, comprise reinforcing elements disposed below and supported by said intermediate columns and beams.

7. The combined bioreactor for wastewater treatment, through anaerobic, aerobic and anoxic processes of organic matter degradation with zone separator system and biogas, scum and sludge collection, according to claim 1, wherein said perforated pipe is disposed in the lower anaerobic zone of the bioreactor and is distributed along the lower anaerobic zone, being placed at about 10 cm from the bottom of said tank in the lower anaerobic zone, so that it has a collection area by means of holes evenly distributed on the bottom; wherein a suction force is maintained in said pipe, further wherein said holes have different diameters ranging from 19.05 mm to 38.1 mm (¾" to 1½") and wherein the size of said holes located in said perforated pipe are smallest in diameter where the suction force is greatest and with said holes increasing in diameter along said perforated pipe as the suction force in the pipe decreases, so that the suction is uniform along the perforated pipe.

8. The combined bioreactor for wastewater treatment, through anaerobic, aerobic and anoxic processes of organic matter degradation with zone separator system and biogas, scum and sludge collection, according to claim 6, wherein said conical collectors further comprise two pipes, one responsible for collection gas and scum which floats to the upper part of the intermediate polyhedral separator panel and another responsible for transferring the sludge which settles and accumulates in the lower part of the intermediate polyhedral separator panel wherein gas-sludge-scum waste is conducted through said pipes to a gas/sludge/scum external separation device wherein said external separation device extracts biogas from said gas-sludge-scum waste.

9. The combined bioreactor for wastewater treatment, through anaerobic, aerobic and anoxic processes of organic matter degradation with zone separator system and biogas, scum and sludge collection, according to claim 1, wherein said at least one biological contact rotor having a top part and a lower part consists of a polyethylene or polypropylene disc of 5.5 m diameter which rotates about an axis by action of a motor, remaining in contact with air and water from the anoxic zone.

10. The combined bioreactor for wastewater treatment, through anaerobic, aerobic and anoxic processes of organic matter degradation with zone separator system and biogas, scum and sludge collection, according to claim 9, further comprising one or more sludge extraction pipes located in the lower part of at least one biological contact rotor connected to semicircular plates that separate the aerobic zone from the anoxic zone wherein below said at least one biological contact rotor are particularly arranged semicircular plates that separate the aerobic zone from the anoxic zone, where at least one sludge extraction pipe is connected, so that biomass that forms a thin layer on the surface of a biological contact rotor and thereafter becomes detached from the rotor does not accumulate in said plates, but is extracted by means of said sludge extraction pipe and recirculated to the anoxic zone, where a portion of the extracted biomass will be degraded and the remaining portion of said biomass will be settled out on the intermediate polyhedral separator panel located in the anoxic zone.

11. The combined bioreactor for wastewater treatment, through anaerobic, aerobic and anoxic processes of organic matter degradation with zone separator system and biogas, scum and sludge collection, according to claim 1, wherein the combined bioreactor further comprises an adjoining homogenization tank where flow and organic load from wastewater is uniformed prior to its supply to the bioreactor.

12. The combined bioreactor for wastewater treatment, through anaerobic, aerobic and anoxic processes of organic matter degradation with zone separator system and biogas, scum and sludge collection, according to claim 1, wherein the combined bioreactor further comprises a water outlet located in the aerobic zone where the biologic contact rotors are located and a clarifier tank located on the opposite side of the water outlet wherein treated water, after passing through the aerobic zone where biological contact rotors are located, flows into said clarifier tank, further wherein said clarifier tank comprises a chamfered wall bottom to encourage sedimentation of biomass detached from biological contact rotors; further comprising recirculation ducts at the bottom of said clarifier tank which redirect biomass to the anoxic one.

13. The combined bioreactor for wastewater treatment, through anaerobic, aerobic and anoxic processes of organic matter degradation with zone separator system and biogas, scum and sludge collection, according to claim 12, wherein said clarifier tank further comprises disinfection means that destroys residual microorganisms.

14. The combined bioreactor for wastewater treatment, through anaerobic, aerobic and anoxic processes of organic matter degradation with zone separator system and biogas, scum and sludge collection, according to claim 4, wherein the height of said intermediate polyhedral separator panel to collect and separate gas, sludge, and scum is between 1.5 and 2 m, at a depth of 5 to 7 m in the tank and the overlap between the intermediate polyhedral separator panel and the baffle is between 10 and 20 cm to prevent the upward flow of gas bubbles.

15. The combined bioreactor for wastewater treatment, through anaerobic, aerobic and anoxic processes of organic matter degradation with zone separator system and biogas, scum and sludge collection, according to claim 13, wherein said disinfection means is UV light.

16. The combined bioreactor for wastewater treatment, through anaerobic, aerobic and anoxic processes of organic matter degradation with zone separator system and biogas, scum and sludge collection, according to claim 13, wherein said disinfection means is an ozone unit and/or a chlorination means.

* * * * *